United States Patent
Ma et al.

(10) Patent No.: US 10,257,012 B2
(45) Date of Patent: Apr. 9, 2019

(54) APPARATUS AND METHOD FOR COARSE TIMING AND FREQUENCY SYNCHRONIZATION

(71) Applicant: Samsung Electronics Co., Ltd., Gyeonggi-do (KR)

(72) Inventors: Xiaoqiang Ma, San Diego, CA (US); Hongbing Cheng, San Diego, CA (US); Linbo Li, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/446,673

(22) Filed: Mar. 1, 2017

(65) Prior Publication Data
US 2018/0167254 A1 Jun. 14, 2018

Related U.S. Application Data

(60) Provisional application No. 62/433,480, filed on Dec. 13, 2016.

(51) Int. Cl.
*H04L 27/26* (2006.01)

(52) U.S. Cl.
CPC ...... *H04L 27/2663* (2013.01); *H04L 27/2601* (2013.01); *H04L 27/2671* (2013.01); *H04L 27/2675* (2013.01)

(58) Field of Classification Search
CPC . H04L 27/2663; H04L 27/2659; H04L 7/042; H04L 7/0079
See application file for complete search history.

(56) References Cited

U.S. PATENT DOCUMENTS

| 7,784,015 B2 * | 8/2010 | Pitts | G06F 17/5072 430/5 |
| 8,023,349 B2 * | 9/2011 | Cho | G11C 29/56 365/201 |
| 8,165,185 B2 | 4/2012 | Zhang et al. | |
| 8,270,528 B2 * | 9/2012 | Zeng | H04L 7/042 375/135 |

(Continued)

OTHER PUBLICATIONS

Andrew Fort, et al., Synchronization and AGC Proposal for IEEE 802.11a Burst OFDM Systems., forta@imec.be, GLOBECOM 2003, pp. 1335-1338.

(Continued)

*Primary Examiner* — Betsy Deppe
(74) *Attorney, Agent, or Firm* — The Farrell Law Firm, P.C.

(57) ABSTRACT

The apparatus includes a plurality of correlation processors configured to each receive a group of samples and generate correlations of each group of samples; a plurality of multipliers each configured to multiply the correlations of one of the plurality of correlation processors by a weight, wherein the weight of at least one of the plurality of multipliers is different from the weight of at least another one of the plurality of multipliers; a summation processor configured to sum the weight multiplied correlations of the plurality of multipliers for time n, where n is an integer; and a coarse timing and coarse frequency processor configured to generate a coarse timing and a coarse frequency based on the sum.

20 Claims, 4 Drawing Sheets

(56) References Cited

U.S. PATENT DOCUMENTS

| | | | |
|---|---|---|---|
| 8,335,283 B1 * | 12/2012 | Sun | H04L 7/042 375/316 |
| 8,605,658 B2 | 12/2013 | Fujimoto | |
| 8,630,374 B2 * | 1/2014 | Roh | H04L 27/2071 370/392 |
| 9,019,991 B1 | 4/2015 | Zhang et al. | |
| 9,055,468 B2 | 6/2015 | Balk et al. | |
| 9,078,237 B2 | 7/2015 | Azizi et al. | |
| 2012/0195401 A1 * | 8/2012 | Becker | H04L 7/042 375/368 |
| 2012/0327871 A1 | 12/2012 | Ghosh et al. | |
| 2015/0289147 A1 | 10/2015 | Lou et al. | |
| 2016/0165482 A1 | 6/2016 | Yang et al. | |
| 2016/0248555 A1 | 8/2016 | Lei et al. | |

OTHER PUBLICATIONS

Pei Xiao, et al., Time Synchronization Algorithms for IEEE 802.11 OFDM Systems, The Institute of Electronics, Communications and Information Technology, pp. 287-290, 2009.

H. Minn, et al., On Timing Offset Estimation for OFDM Systems, IEEE Communications Letters, vol. 4, No. 7, Jul. 2000, pp. 242-244.

* cited by examiner

APPARATUS AND METHOD FOR COARSE TIMING AND FREQUENCY SYNCHRONIZATION

PRIORITY

This application claims priority under 35 U.S.C. § 119(e) to a U.S. Provisional Patent Application filed on Dec. 13, 2016 in the United States Patent and Trademark Office and assigned Ser. No. 62/433,480, the entire contents of which are incorporated herein by reference.

FIELD

The present disclosure relates generally to wireless communication systems, and more particularly, to an apparatus and method for coarse timing and frequency synchronization.

BACKGROUND

Orthogonal frequency division multiplexing (OFDM) techniques have been widely adopted in broadband wireless communication systems, such as long term evolution (LTE) and IEEE 802.11a/n/ac, due to low implementation complexity and robustness against the effects of multi-path propagation. However, OFDM systems are more sensitive to synchronization errors than single carrier systems. Timing and frequency synchronizations are crucial parts of OFDM receiver design. Synchronization of an OFDM signal requires finding the symbol timing and carrier frequency offset. Incorrect timing can introduce inter-symbol interference (ISI) and inter-carrier interference (ICI), which can degrade the system performance severely.

IEEE 802.11a/n/ac has 10 short training fields (STF) with 16 samples each for automatic gain control (AGC) settlement, coarse timing synchronization, and coarse frequency offset estimation. AGC gain is typically set at the largest value and gradually reduced to a proper value. Thus, the few short training field (STF) symbols may be corrupted with unsettled AGC gains. Coarse synchronization and coarse frequency offset estimation using these corrupted STF symbols may degrade synchronization performance.

Auto-correlation and cross-correlation are two basic methods to perform coarse timing synchronization and coarse frequency offset estimation using STF. However, as described earlier, in a non-ideal communication system, the first few STF symbols may be corrupted in an active AGC converging period. This results in a wide plateau of STF auto-correlations, which may give wrong coarse timing synchronization. It may also result in earlier peak detection due to large AGC gain in the beginning with moderate input signal power. One solution is to increase a long training field (LTF) search window after obtaining a coarse timing position. However, this increases hardware complexity with larger memory and more operations. Another solution is to remove the beginning several STF symbols corrupted by high AGC gain. However, it is usually difficult for the receiver to determine which received samples belong to such corrupted STF symbols.

SUMMARY

According to one embodiment, an apparatus includes a plurality of correlation processors configured to each receive a group of samples and generate correlations of each group of samples; a plurality of multipliers each configured to multiply the correlations of one of the plurality of correlation processors by a weight, wherein the weight of at least one of the plurality of multipliers is different from the weight of at least another one of the plurality of multipliers; a summation processor configured to sum the weight multiplied correlations of the plurality of multipliers for time n, where n is an integer; and a coarse timing and coarse frequency processor configured to generate a coarse timing and a coarse frequency based on the sum.

According to one embodiment, a method includes receiving, by each of a plurality of correlation processors, a group of samples; generating, by the correlation processors, correlations of each group of samples; multiplying, by each of a plurality of multipliers, the correlations of one of the plurality of correlation processors by a weight, wherein the weight of at least one of the plurality of multipliers is different from the weight of at least another one of the plurality of multipliers; summing, by a summation processor, the weight multiplied correlations of the plurality of multipliers for time n, where n is an integer; and determining, by a coarse timing and coarse frequency processor, a coarse timing and a coarse frequency based on the summing of the weight multiplied correlations of the plurality of multipliers for time n.

According to one embodiment, a method of manufacturing a coarse timing and frequency synchronization apparatus includes forming the coarse timing and frequency synchronization apparatus on a wafer or a package with at least one other coarse timing and frequency synchronization apparatus, wherein the coarse timing and frequency synchronization apparatus includes a plurality of weighted correlation processors, a summation processor, and a coarse timing and coarse frequency processor; and testing the coarse timing and frequency synchronization apparatus, wherein testing the coarse timing and frequency synchronization apparatus comprises testing the coarse timing and frequency synchronization apparatus using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include a coarse timing and frequency synchronization apparatus including a plurality of weighted correlation processors, a summation processor, and a coarse timing and coarse frequency processor; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
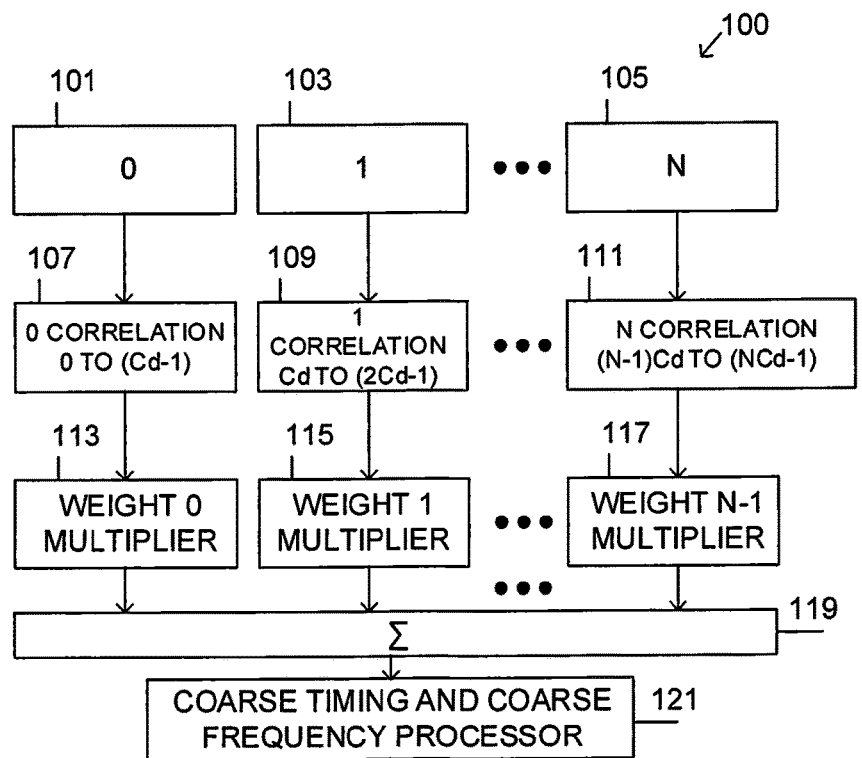
FIG. 1 illustrates an exemplary block diagram of an apparatus for coarse timing and frequency synchronization, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

According to one embodiment, the present apparatus and method applies different weights to different symbol correlations (e.g., STF symbol correlations) to reduce an effect of corruption (e.g., STF corruption) due to a gain of an AGC. The present apparatus and method may be applied to Institute of Electrical and Electronics Engineers (IEEE) standard 802.11a/n/ac systems, and other communication systems with preambles. However, the present disclosure is not limited thereto.

FIG. 1 illustrates an exemplary block diagram of an apparatus for coarse timing and frequency synchronization, according to one embodiment.

Referring to FIG. 1, an apparatus 100 includes N memories 101, 103, and 105, N correlation processors 107, 109, and 111 (e.g., STF correlation processors), N multipliers 113, 115, and 117, a summation processor 119, and a coarse timing and coarse frequency processor 121, where N is an integer (e.g., N=9).

The N memories 101, 103, and 105, numbered from 0 to N−1, each store one of N groups of symbols (e.g., STF symbols) or samples that result from grouping j STF samples (e.g., j=160 STF samples) into N groups of STF samples, where j is an integer. Each of the N groups includes $C_d$ STF samples (e.g., $C_d$=16), and where $C_d$ is an integer.

The N correlation processors 107, 109, and 111 (e.g., N STF correlation processors), numbered from 0 to N−1, each receive $C_d$ samples (e.g., STF samples) from the corresponding N memories 101, 103, and 105. Each of the N correlation processors 107, 109, and 111 performs a correlation on the $C_d$ samples received and outputs the corresponding correlation values. That is, the first (i.e., $0^{th}$) correlation processor 107 produces correlations values for the first (or $0^{th}$) to the $C_d$−1 samples and $C_d$ to the $2C_d$−1 samples of the j samples. The second correlation processor 109 produces correlations values for the $C_d$ to the $2C_d$−1 samples and $2C_d$ to $3C_d$−1 samples of the j samples. The N-lth correlation processor 111 produces correlations values for the (N−2)$C_d$ to the (N−1)$C_d$−1 samples and (N−1)$C_d$ to N$C_d$−1 samples of the j samples.

The N multipliers 113, 115, and 117, numbered from 0 to N−1, are each connected to one of the N correlation processors 107, 109, and 111. The N multipliers 113, 115, and 117 each multiply the correlation values from the corresponding N correlation processors 107, 109, and 111 by a weight to provide a weighted correlation of the corresponding correlations. There are N weights, numbered from 0 to N−1. In one embodiment, the weights are not all the same.

The summation processor 119 includes inputs connected to the outputs of the N multipliers 113, 115, and 117, and an output for providing a summation of the weighted correlations.

Grouping the j samples reduces the memory required to store the weights, and may further reduce a number of multiplications required to obtain one correlation value. Thus, there are only N weights that must be stored in memory.

According to one embodiment, smaller weights are applied for the first few (e.g., a first k number of weights, where k is an integer) weights to reduce an effect of a large unsettled AGC gain. Different weights may be applied to preamble correlation (e.g., auto-correlation). The resulting correlation is used to obtain a coarse timing synchronization and coarse frequency offset estimate. According to one embodiment, the first few weights may be set to zero, and the remaining weights may be set to 1, which is referred to as reduced correlation length. A non-zero timing estimation bias may be required to obtain better timing. For example, an estimation bias may be half of the number of non-zeros.

According to one embodiment, the present weighted auto-correlation scheme may be represented as in Equation (1) as follows:

$$A_{STF}(n) = \Sigma_{i=0}^{l-1} w(i)x(n-i)x^*(n-C_d-i) = \Sigma_{i=0}^{l-1} w(i)c(i) \qquad (1)$$

where n, l, and $C_d$ are integers, N is an integer number of groups, w(i) is a weight of an $i^{th}$ to STF auto-correlation $c(n-i)=x(n-i)x^*(n-C_d-i)$, x(n-i) is an input data sample at time instant (n-i), and $x^*(n-C_d-i)$ is a conjugate of the delayed input data sample at time instant $(n-C_d-i)$. $A_{STF}(n)$ is an STF auto-correlation at time instant n that results from summing l weighted instant correlations with a $C_d$ sample delay.

According to one embodiment where N=9, l=144, and $C_d$=16, where 16 is a length of one STF, a weighted STF auto-correlation scheme may be represented as in Equation (2) as follows:

$$A_{STF}(n) = \Sigma_{i=0}^{143} w(i)x(n-i)x^*(n-16-i) = \Sigma_{i=0}^{143} w(i)c(i) \qquad (2)$$

where n is an integer, w(i) is a weight of an $i^{th}$ STF auto-correlation $c(c-i)=x(n-i)x^*(n-16-i)$, x(n-i) is an input data sample at time instant (n-i), and $x^*(n-16-i)$ is a conjugate of the delayed input data sample at time instant (n-16-i). $A_{STF}(n)$ is an STF auto-correlation at time instant n that results from summing 144 weighted instant correlations with a 16 sample delay. However, the present disclosure is not limited to l=144 or an STF of length 16. Other values for l and the length of an STF are possible.

In a conventional STF correlation, all of the weights w(i) are equal to 1. In one embodiment, a first few weights may be set to 0 and the other weights may be set to 1, which is referred to as STF correlation with reduced length.

To reduce computational complexity, l STF auto-correlations (e.g., l=144) are grouped into N groups (e.g., N=9) with $M_W$ STF correlation values per group (e.g., $M_W$=16). Thus, $A_{STF}(n)$ may be expressed as in Equation (3) as follows:

$$A_{STF}(n) = \sum_{p=0}^{\frac{l}{M_W}-1} w(p) \sum_{q=0}^{M_W-1} x(n-M_W p-q)x^*(n-M_W p-q-C_d) = \qquad (3)$$

$$\sum_{p=0}^{\frac{l}{M_W}-1} w(p) \sum_{q=0}^{M_W-1} c(n, M_W p+q) = \sum_{p=0}^{\frac{l}{M_W}-1} w(p) A_{STF}^{(p)}(n) = \sum_{p=0}^{\frac{l}{M_W}-1} w(p)$$

$$\left( A_{STF}^{(p)}(n-1) + c(n, M_W p+q) - c(n, M_W p+q+C_d) \right)$$

where n, l, and $M_W$ are integers, N is an integer number of groups, $x(n-M_W p-q)$ is an input data sample at time instant $(n-M_W p-q)$, $x^*(n-M_W p-q-C_d)$ is a conjugate of a delayed input data sample at time instant $(n-M_W p-q-C_d)$, w(p) is a weight of a $p^{th}$ STF auto-correlation $c(n, M_W p+q)=x(n-M_W p-q)x^*(n-M_W p-q-C_d)$, and $A_{STF}^{(p)}(n)=\Sigma_{q=0}^{M_W-1} c(n, M_W p+q)$ is a summed correlation with weights w(p). In one embodiment, $A_{STF}^{(p)}(n)$ may be determined recursively as $A_{STF}^{(p)}(n-1)+c(n, M_W p+q)-c(n, M_W p+q+C_d)$, which may significantly reduce hardware complexity.

According to one embodiment where N=9, l=144, and $C_d$=16, a weighted STF auto-correlation scheme may be represented as in Equation (4) as follows:

$$A_{STF}(n) = \sum_{p=0}^{\frac{144}{M_W}-1} w(p) \sum_{q=0}^{M_W-1} x(n-M_W p-q)x^*(n-M_W p-q-16) = \qquad (4)$$

$$\sum_{p=0}^{\frac{144}{M_W}-1} w(p) \sum_{q=0}^{M_W-1} c(n, M_W p+q) = \sum_{p=0}^{\frac{144}{M_W}-1} w(p) A_{STF}^{(p)}(n) =$$

$$\sum_{p=0}^{\frac{144}{M_W}-1} w(p) \left( A_{STF}^{(p)}(n-1) + c(n, M_W p+q) - c(n, M_W p+q+16) \right)$$

where $M_W$ is an integer, N is an integer number of groups, $x(n-M_W p-q)$ is an input data sample at time instant $(n-M_W p-q)$, $x^*n-M_W p-q-16$ is a conjugate of a delayed input data sample at time instant $(n-M_W p-q-16)$, w(p) is a weight of a $p^{th}$ STF auto-correlation $c(n, M_W p+q)=x(n-M_W p-q)x^*(n-M_W p-q-16)$, $A_{STF}^{(p)}(n)=\Sigma_{q=0}^{M_W-1} c(n, M_W p+q)$ is a summed correlation with weights w(p). In an embodiment, $A_{STF}^{(p)}(n)$ may be calculated recursively as $A_{STF}^{(p)}(n-1)+c(n, M_W p+q)-c(n, M_W p+q+16)$, which may significantly reduce hardware complexity.

In one embodiment, the number of STF correlation values may be l=144, the number of groups of STF correlation values may be N=9, and, thus, the number of STF correlation values per group may be $M_W$=16, which may require an additional 18 real multiplications and 80 real additions per input sample. Furthermore, nine complex numbers $A_{STF}^{(p)}(n)$ must be stored.

The coarse timing and coarse frequency processor 121 includes an input connected to the output of the summation processor 119, and an output that provides a coarse timing and coarse frequency based on the summation $A_{STF}(n)$.

$A_{STF}(n)$ is used to determine a coarse timing position with any STF auto-correlation peak search method as expressed in Equation (5) as follows:

$$n_{peak} = \mathrm{argmax}(|A_{STF}(n)|) \qquad (5)$$

A timing estimation bias may be required to be applied in addition to $n_{peak}$ to obtain a final estimated timing position as expressed in Equation (6) as follows:

$$n_{final} = n_{peak} + n_{bias} \qquad (6)$$

The coarse frequency estimation may be determined as expressed in Equations (7) or (8) as follows:

$$\Delta f_{STF} = \frac{2}{\pi} \arg(A_{STF}(n_{peak})) \qquad (7)$$

$$\Delta f_{STF} = \frac{2}{\pi} \arg(A_{STF}(n_{final})) \qquad (8)$$

Figure 2:
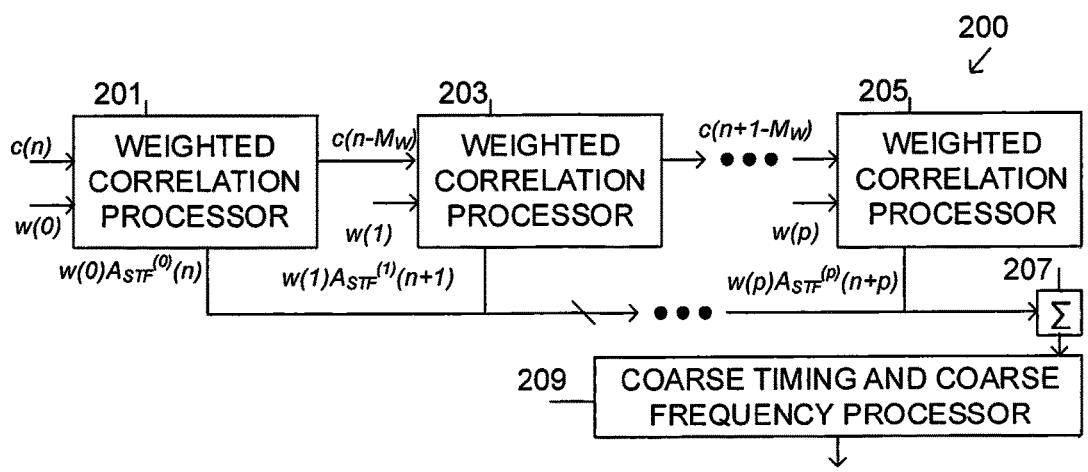
FIG. 2 illustrates an exemplary block diagram of an apparatus for coarse timing and frequency synchronization, according to one embodiment.

FIG. 2 illustrates an exemplary block diagram of an apparatus for coarse timing and frequency synchronization, according to one embodiment.

Referring to FIG. 2, an apparatus 200 includes a plurality of weighted correlation (e.g., autocorrelation) processors 201, 203, and 205 (e.g., STF processors), a summation processor 207, and a coarse timing and coarse frequency processor 209.

The plurality of weighted correlation processors 201, 203, and 205 are connected in daisy-chain fashion, where the number of the plurality of weighted correlation processors is equal to a number of groups N (e.g., N=9) into which correlation values are grouped. Each of the weighted correlation processors 201 and 203, and 205 includes a first input for receiving a correlation value c(n) (e.g., an autocorrelation) at time n, where n is an integer. In addition, each of the weighted correlation processors 201, 203, and 205 includes a second input for receiving a weight w(p) for the corresponding correlation value, where the number of weights is equal to the number of groups N, where N is an integer. Furthermore, each of the weighted correlation processors 201 and 203 includes a first output that provides $c(n-M_W)$, which is a correlation of c(n) that is delayed $M_W$ correlation values, where $M_W$ is the number of correlation values per group, where l is the total number of STF correlations, and where $M_W$ and l are integers. Moreover, each of the weighted correlation processors 201 and 203 includes a second output, and the final weighted correlation processor 205 includes a first output, that provides $w(p)A_{STF}^{(p)}(n)$ to the summation processor 207, which is a weighted summation correlation of c(n) that is weighted by w(p) of the corresponding group p.

In one embodiment, l=144 and N=9. Thus, $M_W$=16. However, the present disclosure is not limited thereto, and other grouping schemes may also be applied, for example, l=144 and N=18, and $M_W$=8; l=144 and N=12, and $M_W$=12; l=144 and N=8, and $M_W$=18; l=144 and N=6, and $M_W$=24; l=144 and N=4, and $M_W$=36, and so on.

According to one embodiment, the weights w(p) may be determined in various ways. For example, smaller weights may assigned in the beginning of STF auto-correlations.

According to one embodiment, weights w(p) may linearly or exponentially increase from one weighted STF correlation processor 201, 203, and 205.

According to one embodiment, weights w(p) may be normalized (e.g., an average of the weights w(p) equals to 1) or un-normalized (e.g., an average of the weights w(p) does not equal to 1). Table 1 below is an exemplary table of un-normalized STF correlation weights. Table 2 below is an exemplary table of normalized STF correlation weights.

TABLE 1

| | W0 | W1 | W2 | W3 | W4 | W5 | W6 | W7 | W8 |
|---|---|---|---|---|---|---|---|---|---|
| Weights 1 | 8/16 | 9/16 | 10/16 | 11/16 | 12/16 | 13/16 | 14/16 | 15/16 | 1 |
| Weights 2 | 24/32 | 25/32 | 26/32 | 27/32 | 28/32 | 29/32 | 30/32 | 31/32 | 1 |
| Weights 3 | 40/48 | 41/48 | 42/48 | 43/48 | 44/48 | 45/48 | 46/48 | 47/48 | 1 |
| Weights 4 | 1/2 | 1/2 | 1/2 | 1/2 | 1 | 1 | 1 | 1 | 1 |

TABLE 2

| | W0 | W1 | W2 | W3 | W4 | W5 | W6 | W7 | W8 |
|---|---|---|---|---|---|---|---|---|---|
| Weights 1 | 12/16 | 13/16 | 14/16 | 15/16 | 1 | 17/16 | 18/16 | 19/16 | 20/16 |
| Weights 2 | 28/32 | 29/32 | 30/32 | 31/32 | 1 | 33/32 | 34/32 | 35/32 | 36/32 |
| Weights 3 | 44/48 | 45/48 | 46/48 | 47/48 | 1 | 49/48 | 50/48 | 51/48 | 52/48 |
| Weights 4 | 1/2 | 1/2 | 1/2 | 1/2 | 1 | 3/2 | 3/2 | 3/2 | 3/2 |
| Weights 5 | 1/2 | 1/2 | 1/2 | 1 | 1 | 1 | 3/2 | 3/2 | 3/2 |
| Weights 6 | 1/2 | 1/2 | 1 | 1 | 1 | 1 | 1 | 3/2 | 3/2 |
| Weights 7 | 1/2 | 1/2 | 1 | 1 | 1 | 1 | 1 | 1 | 2 |
| Weights 8 | 4/8 | 5/8 | 6/8 | 7/8 | 1 | 9/8 | 10/8 | 11/8 | 12/8 |
| Weights 9 | 2/4 | 2/4 | 3/4 | 3/4 | 1 | 5/4 | 5/4 | 6/4 | 6/4 |

According to one embodiment, an AGC settling time may be used to determine the weights. For example, if AGC settles after 5 STFs, the first 4-5 weights may be less than the other weights.

According to one embodiment, an AGC gain step size may be used to determine a difference between consecutive weights before AGC settles.

The summation processor 207 includes an input bus for receiving the weighted summation correlation $w(p)A_{STF}^{(p)}(n)$ of each of the plurality of weighted STF correlation processors 201, 203, and 205, and an output for providing a weighted STF correlation $A_{STF}(n)$ of all of the weighted summation correlations $w(p)A_{STF}^{(p)}(n)$ of the weighted STF correlation processors 201, 203, and 205, where $A_{STF}(n)$ is used to determine a coarse timing and frequency synchronization.

The coarse timing and coarse frequency processor 209 includes an input connected to the output of the summation processor 207, and an output that provides a coarse timing and coarse frequency based on the summation $A_{STF}(n)$.

$A_{STF}(n)$ is used to determine a coarse timing position with any STF auto-correlation peak search method as expressed in Equation (5) above. A timing estimation bias may be required to be applied in addition to $n_{peak}$ to obtain a final estimated timing position as expressed in Equation (6) above. The coarse frequency estimation may be determined as expressed in Equations (7) or (8) above.

Figure 3:
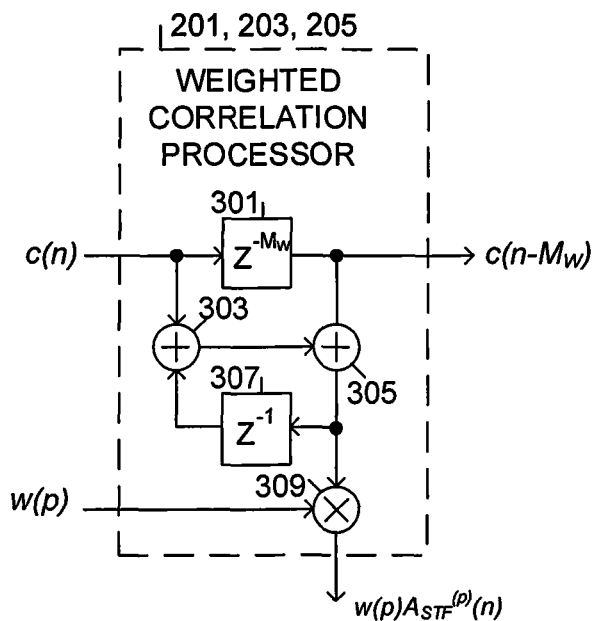
FIG. 3 illustrates an exemplary block diagram of a weighted correlation processor of FIG. 2, according to one embodiment.

FIG. 3 illustrates an exemplary block diagram of a weighted correlation processor 201, 203, and 205 of FIG. 2, according to one embodiment.

Referring to FIG. 3, each of the plurality of weighted correlation processors 201 (e.g., STF processors), 203, and 205 includes a correlation delay processor of $M_W$ correlation values 301, a first adder 303, a second adder 305, a correlation delay processor of one value 307, and a multiplier 309, where l correlation values (e.g., l=144) are grouped into N groups (e.g., N=9), where there are $M_W$ correlation values in each of the N groups (e.g., $M_W$=16).

The correlation delay processor of $M_W$ correlation values 301 includes an input for receiving a correlation c(n) at time n, where n is an integer, and an output for providing $c(n-M_W)$ (e.g., c(n−16)), which is the correlation c(n) delayed $M_W$ correlation values.

The first adder 303 includes a first input that receives the correlation c(n), a second input, and an output.

The second adder 305 includes a first input that receives $c(n-M_W)$, a second input connected to the output of the first adder 303, and an output for providing $A_{STF}^{(p)}(n)$, which is a summed correlation of c(n).

The correlation delay processor of one sample 307 includes an input connected to the output of the second adder 305, and an output connected to the second input of the first adder 303 for providing $A_{STF}^{(p)}(n-1)$, which is the summed correlation of c(n) delayed one sample.

The multiplier 309, includes a first input for receiving a weight w(p), which is one of the weights of the N groups that correspond to the weighted STF correlation processor 201, 203, and 205, a second input connected to the output of the second adder 305 for receiving $A_{STF}^{(p)}(n)$, and an output for providing $w(p)A_{STF}^{(p)}(n)$, which is a weighted summation of the correlation c(n).

Figure 4:
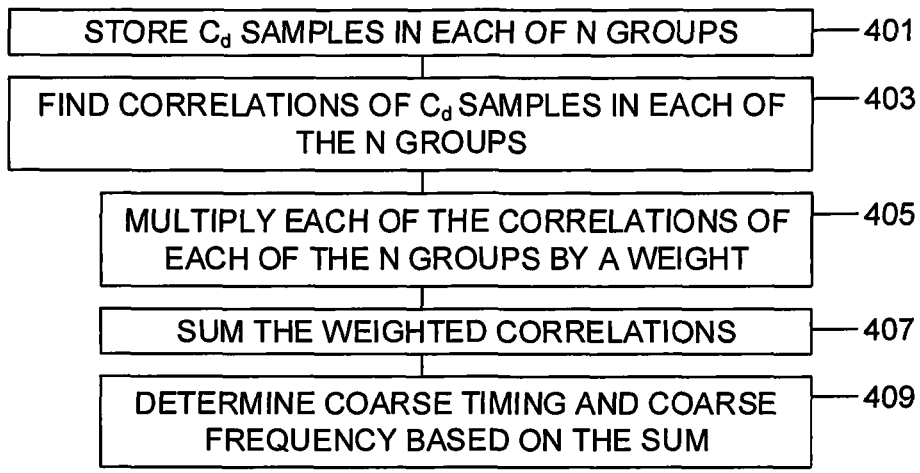
FIG. 4 illustrates an exemplary flowchart of a method of coarse timing and frequency synchronization, according to one embodiment.

FIG. 4 illustrates an exemplary flowchart of a method of coarse timing and frequency synchronization, according to one embodiment.

Referring to FIG. 4, the method includes storing, at 401, $C_d$ samples (e.g., STF samples) in each of N groups of STF symbols or samples that result from grouping l STF samples (e.g., l=144 STF samples) into the N groups of STF samples, where l is an integer, and where $C_d$ is an integer (e.g., $C_d$=16).

At 403, the method determines correlations in N correlation processors for each $C_d$ sample in the corresponding N memories. The correlation performs an auto-correlation.

At 405, N multipliers each multiply the correlation values from the corresponding N correlation processors by a weight to provide a weighted correlation of the corresponding correlations. There are N weights. In one embodiment, the weights are not all the same.

At 407, a summation processor sums the weighted correlations provided by the N multipliers.

At 409, a coarse timing and a coarse frequency are determined based on the summation.

In one embodiment, the summation is used to determine a coarse timing position with any auto-correlation peak search method as expressed in Equation (5) above. A timing estimation bias may be required to be applied in addition to $n_{peak}$ to obtain a final estimated timing position as expressed in Equation (6) above. The coarse frequency estimation may be determined as expressed in Equations (7) or (8) above.

Figure 5:
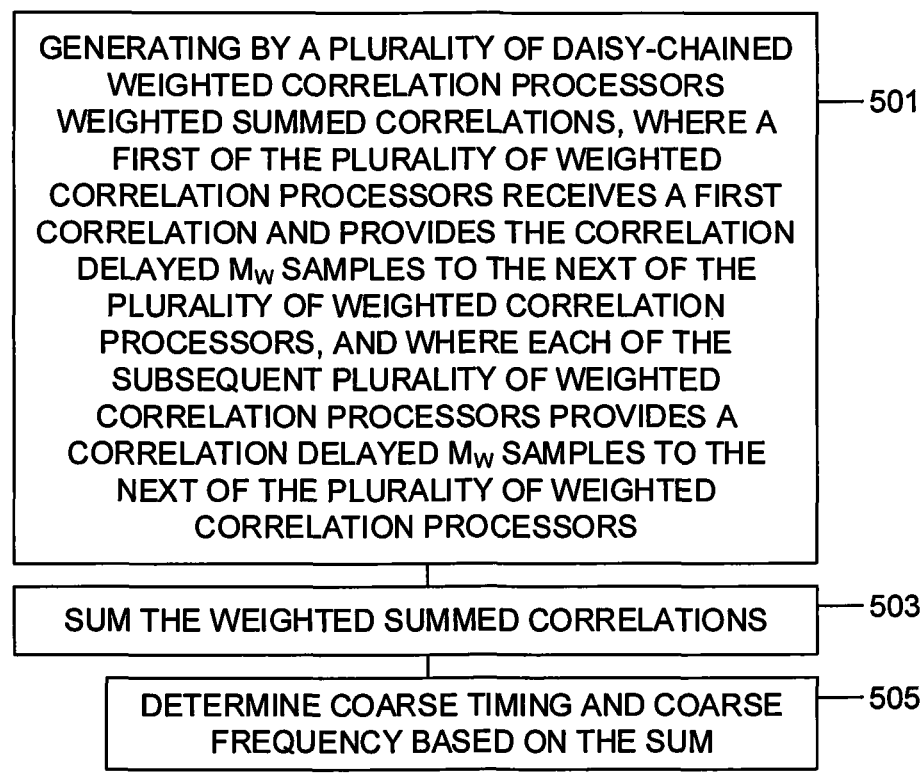
FIG. 5 illustrates an exemplary flowchart of a method of coarse timing and frequency synchronization, according to one embodiment.

FIG. 5 illustrates an exemplary flowchart of a method of coarse timing and frequency synchronization, according to one embodiment.

Referring to FIG. 5, the method includes generating by a plurality of daisy-chained weighted correlation processors weighted summed correlations, where a first of the plurality of weighted correlation processors receives a first correlation and provides the correlation delayed $M_W$ correlation values to the next of the plurality of weighted correlation processors, and where each of the subsequent plurality of weighted correlation processors provides a correlation delayed $M_W$ correlation values to the next of the plurality of weighted correlation processors, at 501. In this case, l is a number of correlation values (e.g., l=144 STF correlation values), and N is a number of groups (e.g., N=9) into which the l correlation values are grouped, where $M_W$ (e.g., $M_W$=16), l, and N are integers.

At 503, the weighted summed correlations are summed by a summation processor.

At 505, a coarse timing and a coarse frequency are determined based on the summation.

In one embodiment, the summation is used to determine a coarse timing position with any auto-correlation peak search method as expressed in Equation (5) above. A timing estimation bias may be required to be applied in addition to $n_{peak}$ to obtain a final estimated timing position as expressed in Equation (6) above. The coarse frequency estimation may be determined as expressed in Equations (7) or (8) above.

Figure 6:
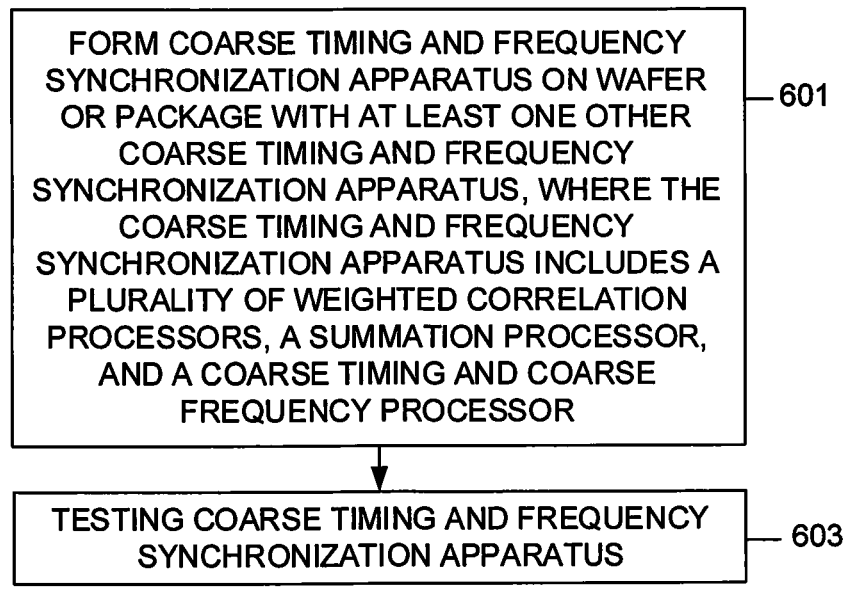
FIG. 6 illustrates an exemplary flowchart of a method of manufacturing a coarse timing and frequency synchronization apparatus, according to one embodiment.

FIG. 6 illustrates an exemplary flowchart of a method of manufacturing a coarse timing and frequency synchronization apparatus, according to one embodiment.

Referring to FIG. 6, a coarse timing and frequency synchronization apparatus is formed on a wafer or a package with at least one other coarse timing and frequency synchronization apparatus, where the coarse timing and frequency synchronization apparatus includes a plurality of weighted correlation (e.g., autocorrelation) processors, a summation processor, and a coarse timing and coarse frequency processor at 601.

At 602, the coarse timing and frequency synchronization apparatus is tested. Testing the coarse timing and frequency synchronization apparatus may include testing the coarse timing and frequency synchronization apparatus using one or more electrical to optical converters, one or more optical splitters that split an optical signal into two or more optical signals, and one or more optical to electrical converters.

Figure 7:
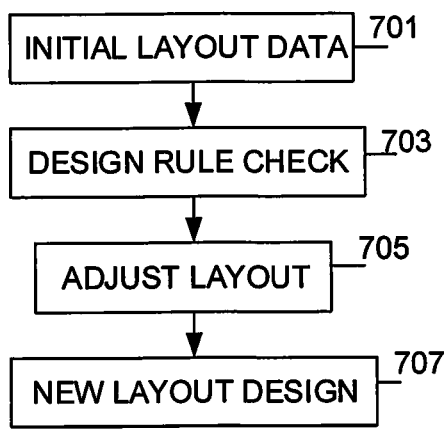
FIG. 7 illustrates an exemplary flowchart of a method of constructing an integrated circuit, according to one embodiment.

FIG. 7 illustrates an exemplary flowchart of a method of constructing an integrated circuit, according to one embodiment.

Referring to FIG. 7, initial layout data is constructed in 701. For example, a mask layout is generated for a set of features for a layer of the integrated circuit, wherein the mask layout includes standard cell library macros for one or more circuit features that include a coarse timing and frequency synchronization apparatus that includes a plurality of weighted correlation (e.g., autocorrelation) processors and a summation processor, and disregarding relative positions of the macros for compliance to layout design rules during the generation of the mask layout.

At 703, a design rule check is performed. For example, the method may check the relative positions of the macros for compliance to layout design rules after generating the mask layout.

At 705, the layout is adjusted. For example, the method, upon detection of noncompliance with the layout design rules by any of the macros, may modify the mask layout by modifying each of the noncompliant macros to comply with the layout design rules.

At 707, new layout data is generated. For example, the method may generate a mask according to the modified mask layout with the set of features for the layer of the integrated circuit. Then, the integrated circuit layer according to the mask may be manufactured.

Although certain embodiments of the present disclosure have been described in the detailed description of the present disclosure, the present disclosure may be modified in various forms without departing from the scope of the present disclosure. Thus, the scope of the present disclosure shall not be determined solely based on the described embodiments, but rather determined based on the accompanying claims and equivalents thereto.

What is claimed is:

1. An apparatus, comprising:
a plurality of correlation processors configured for each correlation processor to receive a group of samples and generate correlations for the received group of samples;
a plurality of multipliers each configured to multiply the correlations corresponding to one of the plurality of correlation processors by a weight, wherein the weight of each of the plurality of multipliers is uniquely different from the weights of at least two of the plurality of multipliers and the correlations;

a summation processor configured to sum the weight multiplied correlations of the plurality of multipliers for time n, where n is an integer; and a coarse timing and coarse frequency processor configured to generate a coarse timing and a coarse frequency based on the sum.

2. The apparatus of claim 1, wherein each of the plurality of correlation processors receives one group of short training field (STF) samples from N groups of STF samples, wherein the total number of STF samples is j, and where $C_d$ is a number of samples per group, and wherein N, j, and $C_d$ are integers.

3. The apparatus of claim 1, wherein a first group of samples includes short training field (STF) samples 0 to $C_d-1$, a second group of STF samples includes STF samples $C_d$ to $2C_d-1$, and a last group of STF samples includes STF samples $(N-1)C_d$ to $NC_d-1$, where $C_d$ is a number of samples per group, and wherein N, j, and $C_d$ are integers.

4. The apparatus of claim 1, wherein the weights of a first k number of the plurality of multipliers are less than the weights of others of the plurality of multipliers.

5. The apparatus of claim 4, wherein the weights of the first k number of the plurality of multipliers are set to 0 and the weights of others of the plurality of multipliers are set to 1.

6. The apparatus of claim 1, wherein the summation processor is configured to sum the weight multiplied correlations of the plurality of multipliers in accordance with the following expression:

$$A_{STF}(n) = \sum_{p=0}^{\frac{144}{M_W}-1} w(p) \sum_{q=0}^{M_W-1} x(n-M_W p-q) x^*(n-M_W p-q-16) =$$

$$\sum_{p=0}^{\frac{144}{M_W}-1} w(p) \sum_{q=0}^{M_W-1} c(n, M_W p+q) = \sum_{p=0}^{\frac{144}{M_W}-1} w(p) A_{STF}^{(p)}(n) =$$

$$\sum_{p=0}^{\frac{144}{M_W}-1} w(p) \big(A_{STF}^{(p)}(n-1) + c(n, M_W p+q) - c(n, M_W p+q+16)\big),$$

where $M_w$ is an integer, $x(n-M_W p-q)$ is an input data sample at time instant $(n-M_W p-q)$, $x^*(n-M_W p-q-16)$ is a conjugate of a delayed input data sample at time instant $(n-M_W p-q-16)$, $w(p)$ is a weight of a $p^{th}$ short training field (STF) auto-correlation $c(n,M_W p)=x(n-M_W p-q)x^*-M_W p-q-16)$, and $A_{STF}^{(p)}(n) = \sum_{q=0}^{M_W-1} c(n, M_W p+q)$ is a summed correlation with weights $w(p)$.

7. The apparatus of claim 6, wherein $A_{STF}^{(p)}(n)$ is calculated recursively as follows: $A_{STF}^{(p)}(n-1)+c(n,M_W p+q)-c(n, M_W p+q+16)$.

8. The apparatus of claim 6, wherein the coarse timing and coarse frequency processor uses the summation $A_{STF}(n)$ to determine the coarse timing with an STF auto-correlation peak search method as follows:

$n_{peak}=\text{argmax}(|A_{STF}(n)|)$, and wherein the coarse frequency is determined as follows:

$$\Delta f_{STF} = \frac{2}{\pi}\arg(A_{STF}(n_{peak})).$$

9. The apparatus of claim 6, wherein the coarse timing and coarse frequency processor uses the summation $A_{STF}(n)$ to determine a coarse timing position with an STF auto-correlation peak search method as follows:

$n_{peak}=\text{argmax}(|A_{STF}(A_{STF}(n)|)$, wherein a timing estimation bias is applied in addition to $n_{peak}$ to obtain a final estimated timing position as follows:

$n_{final}=n_{peak}+n_{bias}$, and wherein the coarse frequency is determined as follows:

$$\Delta f_{STF} = \frac{2}{\pi}\arg(A_{STF}(n_{final})).$$

10. A method, comprising:
receiving, by each of a plurality of correlation processors, a group of samples;
generating, by each of the plurality of correlation processors, correlations for a corresponding group of samples;
multiplying, by each of a plurality of multipliers, the correlations corresponding to one of the plurality of correlation processors by a weight, wherein the weight of each of the plurality of multipliers is uniquely different from the weights of at least two of the plurality of multipliers and the correlations;
summing, by a summation processor, the weight multiplied correlations of the plurality of multipliers for time n, where n is an integer; and
determining, by a coarse timing and coarse frequency processor, a coarse timing and a coarse frequency based on the summing of the weight multiplied correlations of the plurality of multipliers for time n.

11. The method of claim 10, wherein receiving, by each of the plurality of the correlation processors, the group of samples comprises receiving, by each of the plurality of correlation processors, one group of short training field (STF) samples from N groups of STF samples, wherein the total number of STF samples is j, and where $C_d$ is a number of samples per group, and wherein N, j, and $C_d$ are integers.

12. The method of claim 10, wherein a first group of samples includes short training field (STF) samples 0 to $C_d-1$, a second group of STF samples includes STF samples $C_d$ to $2C_d-1$, and a last group of STF samples includes STF samples $(N-1)C_d$ to $NC_d-1$, where $C_d$ is a number of samples per group, and wherein N and $C_d$ are integers.

13. The method of claim 10, wherein the weights of a first k number of the plurality of multipliers are less than the weights of others of the plurality of multipliers.

14. The method of claim 13, wherein the weights of the first k number of the plurality of multipliers are set to 0 and the weights of the others of the plurality of multipliers are set to 1.

15. The method of claim 10, wherein summing, by the summation processor, the weight multiplied correlations of the plurality of multipliers for time n, where n is an integer is comprised of summing, by the summation processor, the weight multiplied correlations of the plurality of multipliers in accordance with the following expression:

$$A_{STF}(n) = \sum_{p=0}^{\frac{144}{M_W}-1} w(p) \sum_{q=0}^{M_W-1} x(n-M_W p-q) x^*(n-M_W p-q-16) =$$

-continued $$\sum_{p=0}^{\frac{144}{M_W}-1} w(p) \sum_{q=0}^{M_W-1} c(n, M_W p + q) = \sum_{p=0}^{\frac{144}{M_W}-1} w(p) A_{STF}^{(p)}(n) =$$

$$\sum_{p=0}^{\frac{144}{M_W}-1} w(p) \left( A_{STF}^{(p)}(n-1) + c(n, M_W p + q) - c(n, M_W p + q + 16) \right),$$

where $M_W$ is an integer, $x(n-M_W p-q)$ is an input data sample at time instant $(n-M_W p-q)$, $x^*(n-M_W p-q-16)$ is a conjugate of a delayed input data sample at time instant $(n-M_W p-q-16)$, $w(p)$ is a weight of a $p^{th}$ short training field (STF) auto-correlation $c(n,M_W p+q)=x(n-M_W p-q)x^*(n-M_W p-q-16)$, and $A_{STF}^{(p)}(n)=\Sigma_{q=0}^{M_W-1} c(n,M_W p+q)$ is a summed correlation with weights $w(p)$.

16. The method of claim 15, wherein $A_{STF}^{(p)}(n)$ is calculated recursively as follows: $A_{STF}^{(p)}(n-1)+c(n,M_W p+q)-c(n, M_W p+q+16)$.

17. The method of claim 15, wherein determining, by the coarse timing and coarse frequency processor, the coarse timing and the coarse frequency based on the summation comprises using the summation $A_{STF}(n)$ to determine the coarse timing with an STF auto-correlation peak search method as follows:

$n_{peak}=\text{argmax}(|A_{STF}(n)|)$, and wherein the coarse frequency is determined as follows:

$$\Delta f_{STF} = \frac{2}{\pi} \arg(A_{STF}(n_{peak})).$$

18. The method of claim 15, wherein determining, by the coarse timing and coarse frequency processor, the coarse timing and the coarse frequency based on the summation comprises using the summation $A_{STF}(n)$ to determine the coarse timing with an STF auto-correlation peak search method as follows:

$n_{peak}=\text{argmax}(|A_{STF}(n)|)$, wherein a timing estimation bias is applied in addition to $n_{peak}$ to obtain a final estimated timing position as follows:

$n_{final}=n_{peak}+n_{bias}$, and wherein the coarse frequency is determined as follows:

$$\Delta f_{STF} = \frac{2}{\pi} \arg(A_{STF}(n_{final})).$$

19. A method of manufacturing a coarse timing and frequency synchronization apparatus, comprising:
forming the coarse timing and frequency synchronization apparatus on a wafer or a package with at least one other coarse timing and frequency synchronization apparatus, wherein the coarse timing and frequency synchronization apparatus includes a plurality of correlation processors configured for each correlation processor to receive a group of samples and generate correlations for the received group of samples; a plurality of multipliers each configured to multiply the correlations corresponding to one of the plurality of correlation processors by a weight, wherein the weight of each of the plurality of multipliers is uniquely different from the weights of at least two of the plurality of multipliers and the correlations; a summation processor configured to sum the weight multiplied correlations of the plurality of multipliers for time n, where n is an integer; and a coarse timing and coarse frequency processor configured to generate a coarse timing and a coarse frequency based on the sum; and
testing the coarse timing and frequency synchronization apparatus, wherein testing the coarse timing and frequency synchronization apparatus comprises testing the coarse timing and frequency synchronization apparatus using one or more electrical to optical converters, one or more optical splitters that split an optical signal into two or more optical signals, and one or more optical to electrical converters.

20. A method of constructing an integrated circuit, comprising:
generating a mask layout for a set of features for a layer of the integrated circuit, wherein the mask layout includes standard cell library macros for one or more circuit features that include a coarse timing and frequency synchronization apparatus including a plurality of correlation processors configured for each correlation processor to receive a group of samples and generate correlations for the received group of samples; a plurality of multipliers each configured to multiply the correlations corresponding to one of the plurality of correlation processors by a weight, wherein the weight of each of the plurality of multipliers is uniquely different from the weights of at least two of the plurality of multipliers and the correlations; a summation processor configured to sum the weight multiplied correlations of the plurality of multipliers for time n, where n is an integer; and a coarse timing and coarse frequency processor configured to generate a coarse timing and a coarse frequency based on the sum;
disregarding relative positions of the macros for compliance to layout design rules during the generation of the mask layout;
checking the relative positions of the macros for compliance to layout design rules after generating the mask layout;
upon detection of noncompliance with the layout design rules by any of the macros, modifying the mask layout by modifying each of the noncompliant macros to comply with the layout design rules;
generating a mask according to the modified mask layout with the set of features for the layer of the integrated circuit; and
manufacturing the integrated circuit layer according to the mask.

* * * * *